(No Model.) 2 Sheets—Sheet 1.
W. MAXWELL.
RACE STARTING MACHINE.
No. 574,205. Patented Dec. 29, 1896.
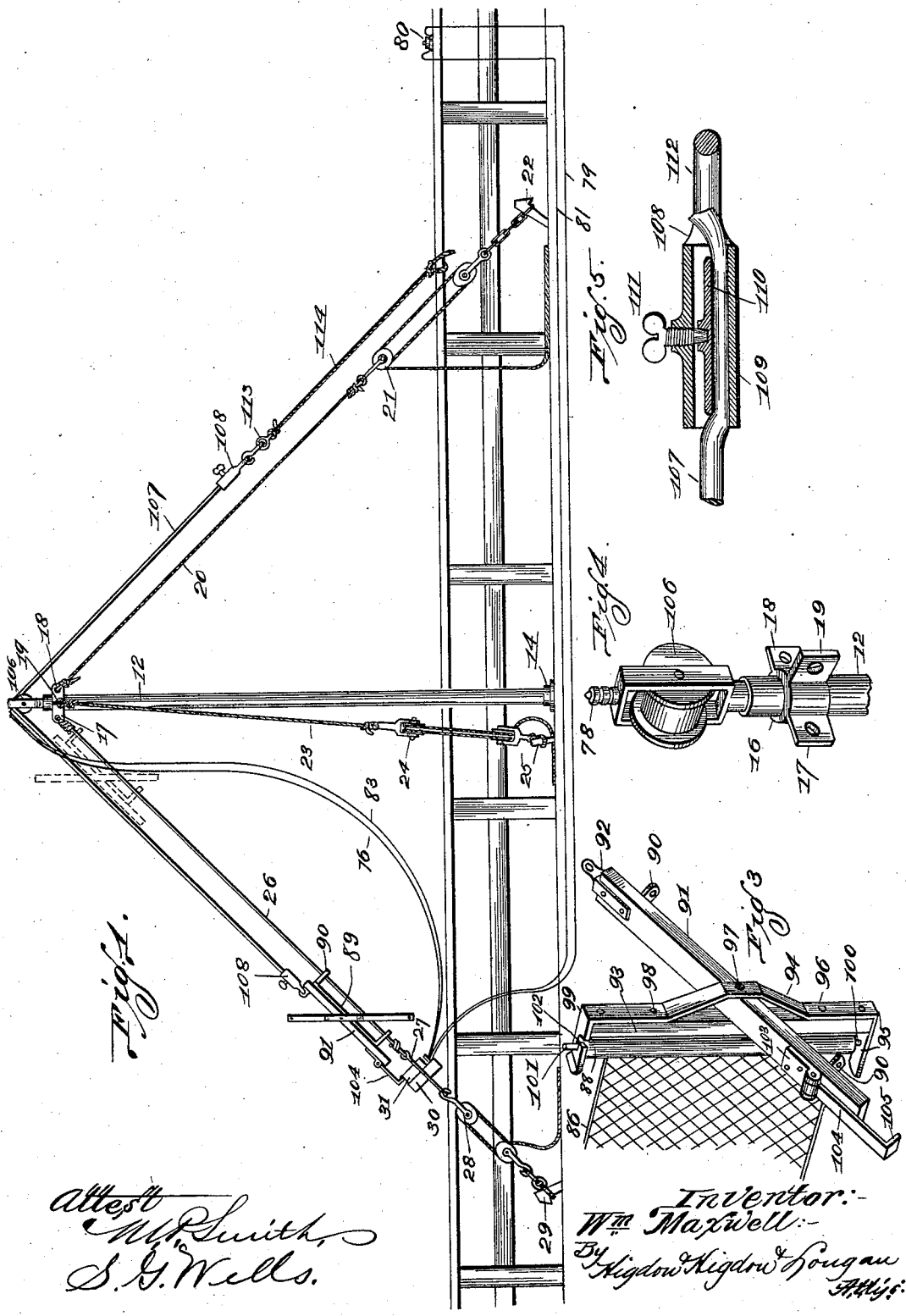
Attest
M. P. Smith
S. G. Wells.
Inventor:—
Wm Maxwell
By Higdon Higdon & Longan
Atty's (No Model.) 2 Sheets—Sheet 2.
W. MAXWELL.
RACE STARTING MACHINE.
No. 574,205. Patented Dec. 29, 1896.
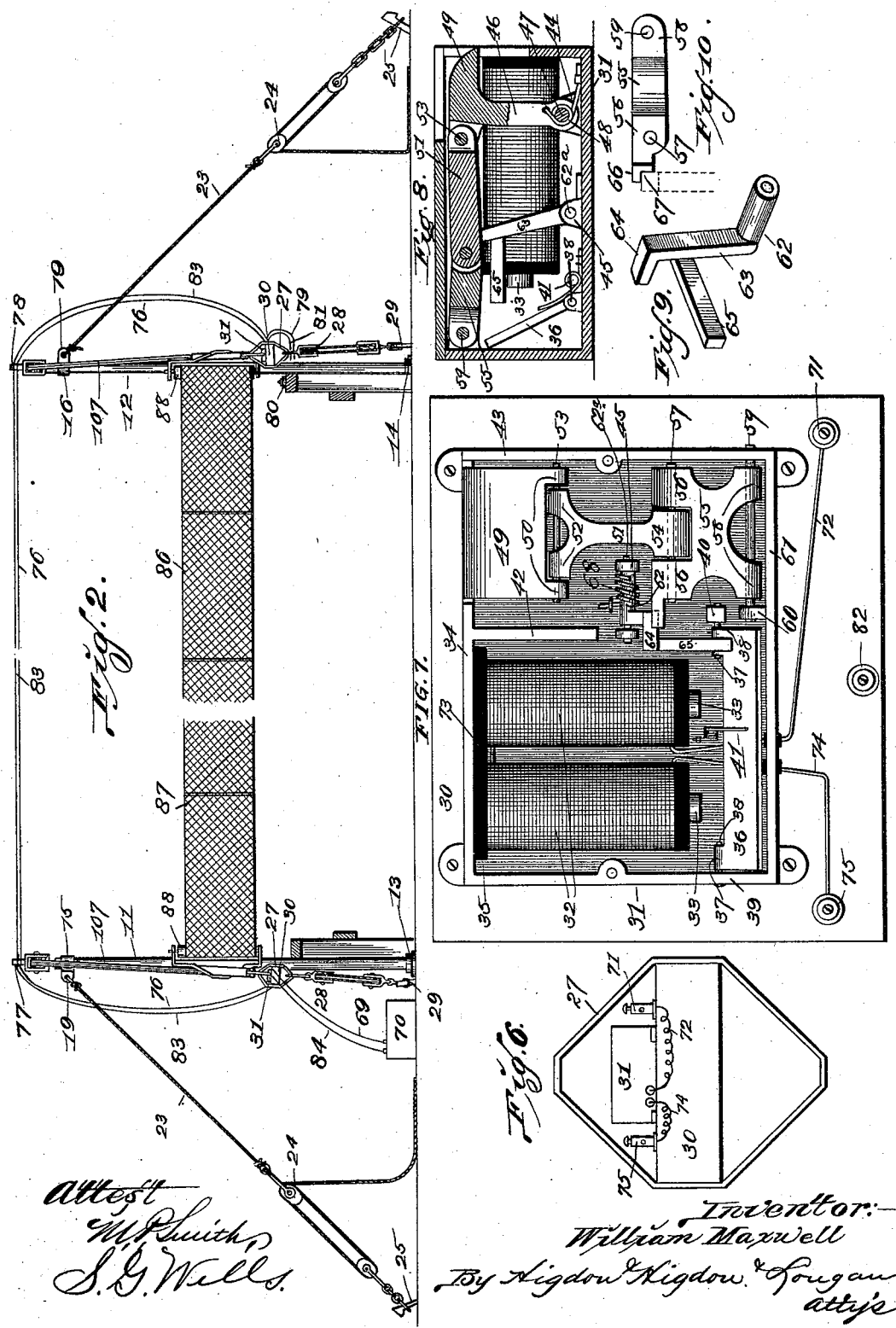
Attest:
M. P. Smith
S. G. Wells
Inventor:—
William Maxwell
By Higdon & Higdon & Longan
atty's.

UNITED STATES PATENT OFFICE.

WILLIAM MAXWELL, OF ST. LOUIS, MISSOURI.

RACE-STARTING MACHINE.

SPECIFICATION forming part of Letters Patent No. 574,205, dated December 29, 1896.

Application filed June 29, 1896. Serial No. 597,504. (No model.)

*To all whom it may concern:*

Be it known that I, WILLIAM MAXWELL, of the city of St. Louis, State of Missouri, have invented certain new and useful Improvements in Race-Starting Machines, of which the following is a full, clear, and exact description, reference being had to the accompanying drawings, forming a part hereof.

My invention relates to race-starting machines; and it consists in the novel construction, combination, and arrangement of parts hereinafter shown, described, and claimed.

Figure 1 is a side elevation of my improved race-starting machine in position for use.
Fig. 2 is a front elevation of the machine. Fig. 3 is an enlarged detail perspective of one end of the netting and mechanism for carrying the same. Fig. 4 is an enlarged detail perspective of the upper end of one of the main posts. Fig. 5 is a longitudinal sectional view of the means I employ in securing the end of the elastic cord of which I make use. Fig. 6 is a side elevation, on an enlarged scale, of one of the electromagnetic boxes of which I make use and the means of mounting the same. Fig. 7 is a top plan view of the electromagnetic apparatus contained in the box shown in Fig. 6, the top of the box being removed. Fig. 8 is a vertical sectional view on the line 8 8 of Fig. 7. Fig. 9 is an enlarged detail perspective of one of the electrically-controlled dogs of which I make use. Fig. 10 is a side elevation of the device which the dog shown in Fig. 9 controls, said dog being indicated in dotted lines in Fig. 10.

In the construction of my improved race-starting machine I employ the two main posts 11 and 12, which are preferably made of gas-pipe and are set in the cast-iron bases 13 and 14, which bases are flat on their bottoms and are designed to rest upon the ground. Near the tops of the posts 11 and 12 are collars 15 and 16, and upon opposite sides of each of said collars are the ears 17 and 18, and projecting from said collars at right angles to said ears 17 and 18 are the ears 19. A guy-rope 20 is attached to the ear 18 upon the post 12, and the lower end of said guy-rope is attached to the block and tackle 21, which is in turn attached to the stake 22, driven in the ground. A guy-rope 23 is attached to the ear 19, and its lower end is attached to the block and tackle 24, which is in turn attached to the stake 25, driven in the ground. The ears 18 and 19 upon the post 11 are connected with the ground in the same manner.

Attached to the ears 17 upon the posts 11 and 12 are heavy wires 26, and the lower end of the wire 26 is attached to the upper end of the frame 27, and the lower end of said frame 27 is attached to the blocks and tackle 28, which are in turn attached to the stakes 29. A block 30 is inserted transversely of each of the frames 27, and a metallic casing or box 31 is attached to the upper face of each of said blocks. Within each of the boxes 31 is the electromagnetic apparatus shown in Fig. 7.

The magnet-coils 32, having the usual magnetic cores 33, are located in the box 31 and are attached to the inner face of the side wall 34 of said box. A block of insulation 35 is situated between the rear ends of the coils 32 and the inner face of the wall 34, and a suitable connection between the rear ends of the cores 33 is made through said block of insulation. The armature 36 is pivotally mounted within the box 31 and in a position to have its free end engage the ends of the magnet-cores 33. Projecting from the lower corner of the armature 36 are ears 37, through which operate the pins 38. One of said pins 38 is positioned in a bearing formed in the wall 39, and the other one of said pins is mounted in the ear 40, which is attached to the bottom of the box 31. A coil-spring 41 has one of its ends attached to the bottom of the box 31, and its free end rests against the rear side of the armature 36, and said spring 41 operates to hold the armature 36 away from the ends of the magnet-cores 33 when said magnet-cores are not energized.

Extending into the box 31 from the side wall 34 and at the opposite side of the magnet-coils 32 from the wall 39 is a wall 42, which wall runs about half-way across the bottom of said box. In the space within the box 31, between the walls 42 and 43, a pair of ears 44 and a pair of ears 45 are attached to the bottom of the box. Posts 46 are pivotally connected to the ears 44 by means of the pin 47, as shown in Fig. 8. A coil-spring 48 encircles the pin 47, and one end of said spring is attached to the bottom of the box 31, while the free end of said spring is attached to one of the posts 46.

Projecting rearwardly at right angles to the posts 46 and from the free end thereof is a jaw 49, and projecting forwardly from the fixed end of the jaw 49 are the ears 50. The bar 51 has the ears 52 attached to one of its ends, said ears being designed to operate between the ears 50, and the pin 53 passes through the ears 50 and the ears 52, forming a pivotal connection between the same. At the opposite end of the bar 51 from the ears 52 is an ear 54. The rectangular plate 55 has the ears 56, between which the ear 54 operates, and the pin 57 passes through said ears 56 and the ear 54 and forms a pivotal connection between the plate 55 and the bar 51. At the opposite side of the plate 55 from the ears 56 are the ears 58, and a pin 59 passes through the wall 43 of the box 31 and then through the ears 58 and through the ear 60, which is attached to the wall 61 of the box 31, which wall 61 is opposite the wall 34. Thus is formed a toggle-joint connection between the jaw 49 and the wall 61.

A hollow shaft 62 is mounted between the ears 45, and a pin 62$^a$ passes through said ears 45 and through said shaft. A bar 63 is connected to one end of said shaft 62 and projects upwardly therefrom at right angles to said shaft, and the upper end 64 of said bar is bent at right angles to the body of said bar and to the opposite side of said bar from the side to which the shaft 62 is attached. An arm 65 is attached to the bar 63 at a point intermediate of its ends and in vertical alinement with the free end of the end 64. The free end of the arm 65 is in position to be engaged by the rear face of the armature 36 when said armature is operated by energizing the magnet-cores 33.

Projecting toward the magnet-coils from the inner ear 56 is an arm 66, having a recess 67 at its lower rear corner, which recess is designed to receive the upper front corner of the end 64. A coil-spring 68 has one end attached to the shaft 62 and passes several times around said shaft, and the other end of said spring is attached to the bottom of the box 31. When the toggle-joint formed by the bar 51 and the plate 55 is nearly straightened, as shown in Fig. 8, the coil-spring 68 operates to press the bar 63 forwardly into engagement with the recess 67 and to carry the end of the arm 65 into a position to be engaged by the armature 36 when said armature is operated.

The spring 48 operates to hold the posts 46 normally in a vertical position. When the armature 36 is operated to engage the end of the arm 65 and push the end 64 out of the recess 67, upward pressure upon the jaw 49 will cause the toggle-joint to bend downwardly, and when said pressure is removed from said jaw the tension of the spring 48 will operate to right the posts 46 into a vertical position, thus straightening the toggle-joint and allowing the end 64 to return to its normal position in the recess 67.

The top of the box 31 is cut away above the jaw 49, and the upper end of the wall 34 of said box is cut away behind said jaw 49, allowing the extreme rear edge of said jaw to project backwardly through said wall.

An electric wire 69 passes from the positive pole of the cell-battery 70 to the binding-post 71, fixed in one corner of the block 30 upon the left-hand side of the track, and a wire 72 leads from said binding-post through the wall 61 of the box 31 to the right-hand one of the magnet-coils 32. A wire 73 connects the magnet-coils, and a wire 74 leads from the left-hand one of the magnet-coils to the binding-post 75, and a wire 76 leads from the binding-post 71 to the insulator 77 upon top of the post 11, and from thence across over the track to the insulator 78 upon top of the post 12, and from thence to the binding-post 71 upon the block at the right-hand side of the track. The wire 79 leads from the binding-post 75 upon said block 30 at the right-hand side of the track to the starters' push-buttons 80, mounted upon the fence, and the wire 81 leads from said push-buttons back to the binding-post 82 upon said right-hand block, and the wire 83 leads from said binding-post 82 to the insulator 78, thence across the track to the insulator 77, and thence to the binding-post 82 upon the left-hand block, and the wire 84 leads from said binding-post 82 upon the left-hand block to the negative pole of the battery 70.

A strip of netting 86 is stretched across the track, as shown in Fig. 2, and stretchers 87 are inserted between the edges of the netting. At each end of the netting 86 is a roller 88, and each of said rollers is mounted and carried as shown in Fig. 3. A bar of iron 89 has its ends bent into parallel positions and at right angles to the body of said bar, thus forming the ears 90, and the wire 26 passes through the perforations in said ears 90, as shown in Fig. 1. A block of wood 91 is attached to the upper side of the bar 89, and an ear 92 is attached to the upper end of said block. A post 93 is vertically positioned inside of the block 91 and against the center of said block. The post 93 is a trifle longer than the roller 88, and a strap of iron 94 is positioned with its lower end extending inwardly from the lower end 95 of the post 93, and said strap extends up and outside of the post 93 and is attached thereto by the screws 96. Then said strap extends outwardly around the outer side of the block 91, and a bolt 97 passes through said strap and through the block 91 and through the post 93. Then said strap passes upwardly and is attached to the upper end of the post 93 by screws 98, and the extreme upper end 99 of said strap is bent inwardly over the upper end of the post 93.

Fixed in the lower end of the roller 88 is a pin 100, designed to operate in the bearing formed in the end 95 of the strap, and a similar pin 101 is fixed in the upper end of said roller 88 and is designed to operate in the slotted bearing 102 in the end 99 of the strap. A plate 103 is attached near the lower end of the block 91, and a strap 104 is hinged to said plate. The lower end 105 of the strap 104 is bent downwardly at right angles to the body of said strap and is designed to engage against the under face of the jaw 49.

Grooved pulleys 106 are mounted at the upper ends of the posts 11 and 12, and elastic cords 107 operate over said pulleys and have clamps 108 attached to their ends. The clamp 108 consists of a tube 109, designed to receive the end of the elastic cord. A concaved plate 110 is inserted in the tube 109 beside the cord, a winged screw 111 is screw-seated in one side of the tube with its point engaging the center of the plate 110, and the end of the cord is gripped by operating the screw 111 and pressing the plate 110 against said cord. A hook 112 is attached to one end of the tube 109, and the hooks of the clamps upon the front ends of the cords engage the ears 92, and the hooks of the clamps upon the opposite ends of said cords engage the hooks 113, which are attached to the ropes 114, which are secured to the fence.

When it is desired to bring the netting 86 down in front of the racers, the mechanism at each end of the netting is manually engaged and the bars 89 slide down the wires 26 until the ends 105 of the straps 104 will engage the under faces of the jaws 49. The elastic cords 107 are of such a length and such a tenacity that when they are left free to operate they will pull the net-carrying mechanism to the upper ends of the wires 26, and when the net-carrying mechanism is manually operated the elastic cords 107 will stretch as required to allow said mechanism to be moved down to the lower ends of the wires 26. When it is desired to remove the netting 86 from in front of the racers, the starter operates the push-button 80, the magnet-cores 33 are energized by the electric current, the armature 36 is attracted and pushes the dog 64 out of the recess 67, allowing the toggle-joint freedom to operate, and the strain of the elastic cords 107 pulling upwardly on the net-carrying mechanism is exerted by the ends of the straps 104 against the under sides of the jaws 49, causing the toggle-joint behind said jaws to give way, allowing said jaw to tip forwardly and thus release the net-carrying mechanism. Then the tension of the elastic cords 107 draws the net-carrying mechanism to the upper ends of the wires 26, thus removing the net from in front of the racers and they are off.

The operation of the machine is practically noiseless, it is easily knocked down and transported from place to place, and it possesses many advantages over the devices heretofore in use.

I claim—

1. In a device of the class described, a suitable barrier movably suspended across the track and electrically-operated mechanism for holding and releasing said barrier, which mechanism consists of electromagnets, armatures operated by said magnets, pivotally-mounted jaws adjacent to said magnets, toggle-joints operating the free ends of the posts supporting said jaws, trip mechanisms for holding and releasing said toggle-joints and in positions to be operated by said armatures, and hooks attached to said barriers and designed to engage said jaws, substantially as specified.

2. In a device of the class described, inclined wires upon opposite sides of the track and extending in a direction parallel with the track, frames slidingly positioned upon said wires, rollers carried by said frames in a vertical position, a netting attached to and connecting said rollers, electrically-controlled mechanisms rigidly fixed in positions adjacent the lower ends of said wires, each of said electrically-controlled mechanisms consisting of an electromagnet, an armature operated by said magnet, a post pivotally mounted adjacent said magnet, a jaw extending from the free end of said post at right angles thereto, a toggle-joint operating the free end of said post, trip mechanism for holding and releasing said toggle-joint and in a position to be operated by said armature; an electric circuit operating said magnets, and hooks upon said sliding frames and engaging said jaws, substantially as specified.

3. In a device of the class described, inclined wires upon opposite sides of the track and extending in a direction parallel with the track, frames slidingly positioned upon said wires, elastic cords attached to said frames in such a way that their tension will be exerted to elevate said frames, a suitable barrier connecting said frames, electrically-controlled mechanism rigidly fixed in positions adjacent the lower ends of said wires; each of said electrically-controlled mechanisms consisting of an electromagnet, an armature operated by said magnet, a post pivotally mounted adjacent said magnet, a jaw extending from the free end of said post at right angles thereto, a toggle-joint operating the free end of said post, trip mechanism for holding and releasing said toggle-joint and in a position to be operated by said armature; an electric circuit operating said magnets, and hooks upon said sliding frame and engaging said jaws, substantially as specified.

4. In a device of the class described, posts upon opposite sides of the track, guy-ropes extending from the tops of said posts in an inclined direction to the ground, stakes driven in the ground, to which the lower ends of said guy-ropes are attached, certain of said guy-ropes forming inclined supports upon opposite sides of the track, a suitable barrier suspended across the track and slidingly connected with said inclined supports, electrically-operated mechanism for holding and releasing said barrier carried by said inclined supports, elastic cords attached to said barrier in such a way that their tension will be exerted to elevate said barrier; which electrically-controlled mechanism consists of electromagnets, armatures operated by said magnets, pivotally-mounted jaws adjacent to said magnets, toggle-joints operating the free ends of the posts supporting said jaws, trip mechanisms for holding and releasing said toggle-joints and in position to be operated by said armatures, and hooks attached to said barriers and designed to engage said jaws, substantially as specified.

In testimony whereof I affix my signature in presence of two witnesses.

WILLIAM MAXWELL.

Witnesses:
S. G. WELLS,
MAUD GRIFFIN.